United States Patent [19]

Church et al.

[11] Patent Number: 4,976,285

[45] Date of Patent: Dec. 11, 1990

[54] UNIVERSAL SELF-VENTING DRAIN VALVE

[75] Inventors: John Church; Victor R. Oelschlaegel, both of Modesto; J. Donald Emery, Mariposa, all of Calif.

[73] Assignee: Parker Hannifin Corporation, Cleveland, Ohio

[21] Appl. No.: 530,773

[22] Filed: May 30, 1990

[51] Int. Cl.$^5$ .............................................. F16K 24/00
[52] U.S. Cl. .................................. 137/588; 137/625.18
[58] Field of Search ............... 137/588, 625.18, 625.19

[56] References Cited

U.S. PATENT DOCUMENTS

| | | | |
|---|---|---|---|
| 208,913 | 10/1878 | Malpass | 137/625.19 X |
| 688,586 | 12/1901 | Brake | 137/588 X |
| 873,172 | 12/1907 | Ritter | 137/588 X |
| 928,813 | 7/1909 | Spikes | 137/588 |
| 1,306,210 | 6/1919 | Zucker | 137/605 |
| 1,490,150 | 4/1924 | Wagner | 251/180 |
| 2,054,488 | 9/1936 | Sinks | 137/588 X |
| 2,056,042 | 9/1936 | Fausek et al. | 251/180 |
| 2,113,046 | 4/1938 | Freemon | 137/588 X |
| 2,878,829 | 3/1959 | Folmsbee | 137/588 |
| 4,440,193 | 4/1984 | Matheson | 137/588 |
| 4,602,657 | 7/1986 | Anderson, Jr. et al. | 137/625.19 X |
| 4,611,627 | 9/1986 | Eidsvoog et al. | 137/588 |
| 4,708,171 | 11/1987 | Cudaback | 137/588 |
| 4,724,074 | 2/1988 | Schaupp | 210/163 |
| 4,753,266 | 6/1988 | Matheson et al. | 137/588 |
| 4,846,223 | 7/1989 | Humbert, Jr. | 137/588 X |
| 4,855,041 | 8/1989 | Church et al. | 137/587 X |
| 4,922,960 | 5/1990 | Oelschlaegel | 137/588 |

FOREIGN PATENT DOCUMENTS 143263  5/1935  Fed. Rep. of Germany .

*Primary Examiner*—John Rivell
*Attorney, Agent, or Firm*—Ralph E. Jocke

[57] ABSTRACT

A self-venting drain valve (10) is mounted on a wall (30) of a fluid container having a fluid hole (32) and a vent hole (34). The valve has a body (20) with a bore (38) therein. A first hole (44) and a second hole (46) extend into said bore coaxial with the fluid and vent holes respectively. A drain port (48) extends through the valve body opposite the first hole. An air vent opening (54) extends through the valve body, generally opposite, but slightly offset from the second hole. A rotatable spool (60) is mounted in the bore. The spool has a first ball portion (62) adjacent the fluid hole and a second ball portion (64) adjacent the vent hole. The first and second ball portions of the spool have fluid passages therethrough. In a first position, the fluid passages in the ball portions are disposed from the fluid and vent openings and the valve is closed. Movement of the spool to a second position, enables the fluid passage in the first ball portion of the spool to receive fluid, placing the container under slight negative pressure. Further movement of the spool to a third position, opens the fluid passage through the second ball portion of the spool and enables air to enter the container so it may readily drain.

21 Claims, 6 Drawing Sheets

UNIVERSAL SELF-VENTING DRAIN VALVE

TECHNICAL FIELD

This invention relates to drain valves used to drain liquids from containers. Particularly, this invention relates to a self-venting drain valve which enables the draining of liquid from a generally air tight container, such as a fuel filter/water separator.

BACKGROUND OF INVENTION

Containers for liquids are periodically drained for a variety of reasons. If the container is generally air tight, provision should be made for allowing air to enter the container. The air displaces the liquid leaving the container and enables the liquid to more readily drain. Fuel filter/water separators used in vehicle fuel systems must periodically be drained to purge contaminants which accumulate therein. In many types of fuel filter/water separators, air must be introduced into the body of the unit before the contaminants may be drained.

To enable air tight fuel filter/water separators to be drained, several types of venting drain valves have been previously developed. These drain valves are generally mounted at or near the bottom of the container. The valves introduce air into the container through an inlet while allowing the fuel and/or contaminants to drain through a fuel outlet in the valve. In some designs such as the one shown in U.S. Pat. No. 4,724,074, the air inlet is located in close proximity to the fluid outlet of the valve. In such designs it is usually necessary to prime the fluid outlet of the valve in advance of the air vent being opened. Priming the fluid outlet creates a slight vacuum inside the unit. Thereafter when the air vent is opened only air will be drawn in through the vent. This avoids liquid flowing outward through the vent as well as air being drawn into the unit through the liquid outlet opening. Either of these conditions would impede draining of the unit.

Self venting drain valves previously known to Applicants have been constructed in two ways. The most common type of self venting drain valve uses a threaded knob which is accepted into the underside of a fluid container. The knob contains two internal passageways. From a closed position the knob is rotated several turns causing it to move outward due to the interaction of the threads. Eventually, a liquid passageway is opened through the knob to the interior of the container. The opening of the liquid passageway primes the outlet of the drain valve. Further rotation of the knob additional turns opens an air passageway which vents the container and enables air to displace the liquid which flows outward through the liquid outlet of the valve. This type of self-venting valve though generally satisfactory presents certain disadvantages. First it requires the use of mating threads on the knob and the container. It also requires two separate seals and sealing surfaces. These aspects add to manufacturing cost for the valve and each is a potential source for leakage or failure.

Another type of self-venting drain valve employs a threaded drain knob and a spring loaded vent. As the knob is turned several rotations, a fluid outlet is opened. Further outward movement of the knob opens a spring loaded vent allowing air to enter the interior of the container. This construction is shown in U.S. Pat. No. 4,855,041, which is owned by the assignee of the present invention. Again, this type of drain valve construction has the associated expense and potential problems of threaded pieces and multiple seals.

The types of self-venting drain valves mentioned above have an additional drawback in that the drain knob must be turned multiple turns to reach an open condition. This takes time. Also, the knobs typically have no stops to prevent them from being over tightened when closed, or from being loosened too far to a point where the knob disengages the threads and falls off the container. It is also difficult to connect a hose to a drain valve that must be turned several turns to the open condition. This makes it difficult to attach a permanent hose to the drain valve to carry away fluid discharged from the container.

Another type of self-venting drain valve is shown in U.S. Pat. No. 4,753,266. This drain valve includes a rotatable knob positioned at the bottom of a container. The extent to which the knob of this valve must be turned to reach the open condition is less than in some other valve types. This drain valve presents the drawback that it is a costly construction which requires structural components inside the container to insure that air enters the vent passage and that only liquid comes out of the liquid drain port. A further disadvantage associated with this valve, as well as other types known to Applicants, is that they extend substantially beyond the lower wall of the unit or container on which they are mounted. This increases the probability that the drain valve may be inadvertently bumped open or completely knocked off the unit.

In some applications, such as rectangular shaped vessels, it is desirable to locate the drain valve on a side wall of the unit rather than on the underside. Most conventional self venting drain valve constructions cannot be used to drain fluid through both a vertical wall or a horizontal wall of a unit without modification. This increases the number of items that must be manufactured.

Thus, there exists a need for a self venting drain valve that is simpler and less expensive to manufacture. There further exists a need for a valve that is lower in profile, opens quickly, can be installed without modification either on a vertical or a horizontal wall and which can be used with a permanently attached hose or other conduit.

DISCLOSURE OF INVENTION

It is an object of the present invention to provide a self-venting drain valve that is inexpensive to manufacture.

It is a further object of the present invention to provide a self-venting drain valve that is simpler and more reliable.

It is a further object of the present invention to provide a self venting drain valve that can be opened with a minimum of movement.

It is a further object of the present invention to provide a self venting drain valve which may be attached to a hose or other conduit.

It is a further object of the present invention to provide a self venting drain valve that is lower in profile.

It is a further object of the present invention to provide a self venting drain valve that cannot accidentally be overtightened.

It is a further object of the present invention to provide a self venting drain valve that cannot be accidentally detached from a fluid container on which it is mounted.

It is a further object of the present invention to provide a self venting drain valve that can be mounted either on generally vertical or horizontal walls without modification.

Further objects of the present invention will be made apparent in the following Best Modes For Carrying Out The Invention and the appended claims.

The foregoing objects are accomplished in the preferred form of the invention by a drain valve which is mounted on a bottom wall of a fuel filter/water separator unit. The unit includes a generally planar, horizontal wall on a lower portion thereof. A circular fluid drain hole extends through the wall on the inside of the unit. A circular vent hole which is disposed from the fluid hole, also extends through the wall.

A generally rectangular valve body is mounted to the wall over the vent hole and the fluid hole. The body includes a cylindrical bore that extends generally parallel to the plane of the wall. A first hole extends through the body perpendicular to the bore and in alignment with the fluid hole in the wall of the unit. A second hole extends though the valve body perpendicular to the bore and in alignment with the vent hole through the wall. A first resilient seal is positioned in the first hole and a second similar resilient seal is positioned in the second hole. Each of these seals includes an opening through which fluid may pass from the fluid hole and vent hole respectively, into the bore.

The valve body also includes a drain port through which fluid drained from the unit may pass. The drain port is in fluid communication with the bore and extends through the body opposite the first hole. The valve body also includes an air vent opening that extends through the body from the bore. The air vent opening is generally opposite the second hole, but is slightly offset therefrom.

A spool is mounted in the bore. The spool includes a first ball portion adjacent the fluid hole in the unit wall and a second ball portion adjacent the vent hole in the unit wall. The spool also includes a hand engaging portion which extends outside the body which enables the spool to be rotated manually.

The first ball portion has a cylindrical first fluid passage that extends therethrough. The second ball portion of the spool has a second cylindrical passage that extends therethrough. The second fluid passage through the second ball is somewhat smaller than the first fluid passage in the first ball portion. The second fluid passageway also has an air inlet opening adjacent the vent hole that is substantially smaller than the size of the vent hole through the unit wall.

When the spool is in a first position, neither the first fluid passage through the first ball portion nor the second fluid passage though the second ball portion is in communication with the fluid hole or vent hole of the unit. No fluid or air may pass to or from the unit in the first position, as the seals maintain a fluid tight relationship between the unit wall surrounding the vent and drain holes and the curved faces of the ball portions of the spool.

When the spool is turned in a first direction from the first position, the first fluid passage in the first ball portion of the spool is brought into fluid communication with the fluid hole through the first hole in the body of the valve. In this second position of the spool, some fluid leaves the unit through the first ball portion and drains from the drain port of the valve body. However, in the second position, the second fluid passage through the second ball portion of the spool is not in communication with the vent hole. As a result the interior of the unit is placed under a slight negative pressure. Fluid eventually stops draining from the valve as a result.

Further movement of the spool in the first direction from the second position, eventually brings the spool into a position wherein the second fluid passageway in the second ball portion of the spool enters into fluid communication with the vent hole of the unit. In this third position, the second fluid passageway is also in communication with the air vent opening through the valve body. Air is able to enter the valve and through the vent opening and from there is passed into the body of the unit. As the unit is under slight negative pressure when the second fluid passage is opened, only air enters the unit and no fluid attempts to drain out of the vent hole.

Likewise, as the spool is moved from the second position to the third position, the first fluid passage in the first ball portion of the spool is brought into alignment with the fluid hole in the wall of the unit and the drain port of the valve body. Fluid passes from the fluid hole in the unit, through the first ball portion and exits from the valve through the drain port.

The hand engaging portion on the spool includes an ear which extends radially outward. The body of the valve includes positive stops so that the spool may not be turned in the first direction beyond the third position. Stops are provided because turning the spool beyond the fully opened position would impede draining of the unit.

Once the unit has been drained, the spool may be turned in a direction opposed to the first direction back to the first position, wherein the valve is fully closed. A further stop on the valve body prevents turning the spool in the opposed direction beyond the first position and insures proper closure of the valve.

BEST MODE FOR CARRYING OUT INVENTION

Figure 1:
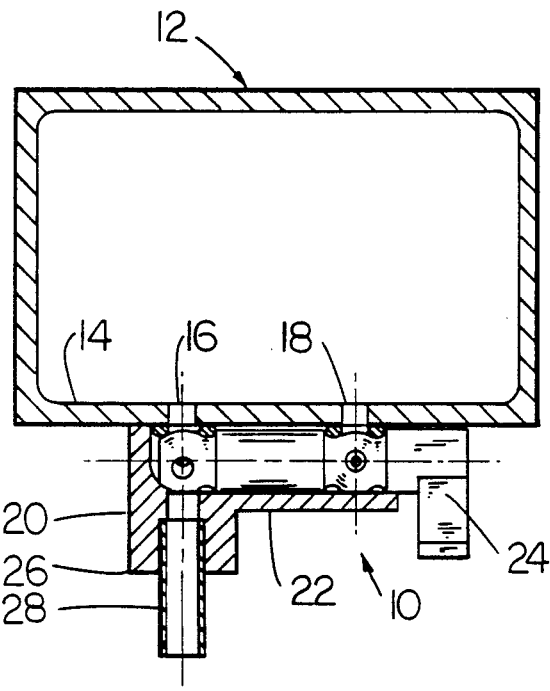
FIG. 1 is a cross-sectional view of the self venting drain valve of the present invention mounted on a liquid container in horizontal position.

Referring now to the drawings and particularly to FIG. 1, there is shown therein the preferred embodiment of the self-venting drain valve of the present invention generally indicated 10. Drain valve 10 is mounted on a generally air tight fluid container schematically indicated 12. Although container 12 is shown as a simple closed container in FIG. 1, it is understood that in the preferred application, the valve is used to drain a fuel filter/water separator. Container 12 includes a lower wall 14. Lower wall 14 has a fluid hole 16 and a vent hole 18 therethrough. Valve 10 has a body 20 which is fastened to container 12 by fastening means (not shown). Valve 10 has a rotatable spool 22 mounted in said body adjacent wall 14. Spool 22 includes a hand engaging lever 24 which extends from body 20 and enables manual rotation of the spool. Valve 10 also has a fluid drain port 26 which is adapted for receiving a drain hose 28 or other type of fluid conduit which may be used to carry away fluid that is drained from the container.

Figure 2:
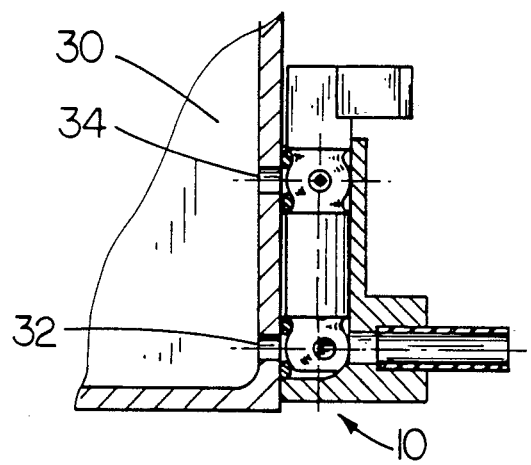
FIG. 2 is a cross-sectional view of the self-venting drain valve of the present invention mounted on a liquid container in a vertical position.

FIG. 2 shows valve 10 mounted in a vertical position. In FIG. 2, the valve is mounted to a wall 30 which similarly includes a fluid hole 32 and a vent hole 34 therethrough. It will be readily understood by those skilled in the art that water and other impurities in fuel generally collect in a lower portion of the container and thus it is desirable to mount drain valve 10 with the fluid hole near the lowest portion of the container so that such settled impurities may be removed.

Figure 3:
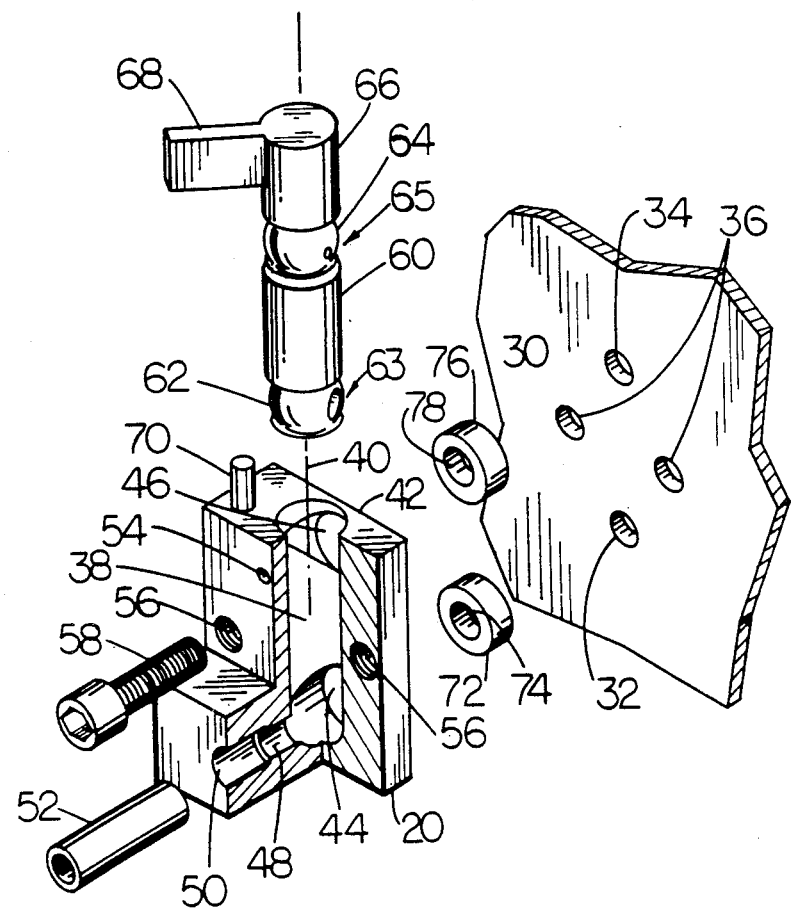
FIG. 3 is an exploded, partially sectioned view of the self venting drain valve of the present invention.

Valve 10 is shown in greater detail in FIG. 3. Wall 30 of the container (only a portion of which is shown) has fluid hole 32 and vent hole 34 extending therethrough. Wall 30 also includes a pair of fastening holes 36 which accept fastening means for purposes later explained. Valve body 20 includes cylindrical bore 38 which extends partially therethrough. Bore 38 extends along an axis 40 generally parallel of the plane of wall 30.

Valve body 20 also includes a facing wall 42 which is in abutting relation of container wall 30. A first hole 44 extends through wall 42 into bore 38. (see also FIGS. 4 (a) and (b) through FIGS. 6 (a) and (b)). First hole 44 is concentric with fluid hole 32 but is somewhat larger.

A second hole 46 extends through the valve body from wall 42 into bore 38. Second hole 46 is similarly sized to first hole 44, but is sufficiently displaced therefrom to be centered over the vent hole 36 in the wall of the container. Like first hole 44, second hole 46 is somewhat larger than the corresponding vent hole 36 through the wall of the container.

A drain port 48 extends through valve body 20 from bore 38. Drain port 48 is positioned opposite first hole 44 and is concentric therewith. Drain port 48 incorporates conduit accepting means 50 for accepting a conduit such as hose 52. Other types of conduits could be used in place of hose 52 for carrying away fluid that is drained from the container through valve 10 such as rigid pipes or tubing, and drain port 48 could readily incorporate threads for this purpose.

An air vent opening 54 extends through valve body 20 from bore 38. Air vent opening 54 is generally opposite second hole 46 but is slightly offset from the centerline of vent hole 34 through the container (See FIGS. 4(b) through 6(b)). A pair of bolt holes 56 extend through body 20. Bolt holes 56 accept bolts 58 (only one of which is shown) which thread into holes 36 in wall 30. Bolts 58 serve as fastening means to hold the body of the valve against the wall of the container.

A spool 60 is positioned in bore 38 and is rotatable therein. Spool 60 serves as a movable member and includes a first ball portion 62 having a spherical shape at a lower end thereof. First ball portion 62 is positioned adjacent fluid hole 3 in the wall of the container when the spool is mounted in the bore. First ball portion 62 includes a first fluid passage generally indicated 63 which extends therethrough.

Spool 60 also has a second ball portion 64 disposed from first ball portion 62. Second ball portion 64 is adjacent vent hole 34 in the wall of the container when the spool is mounted in the valve. Second ball portion 64 has a second fluid passage generally indicated 65, which extends therethrough.

Figure 3A:
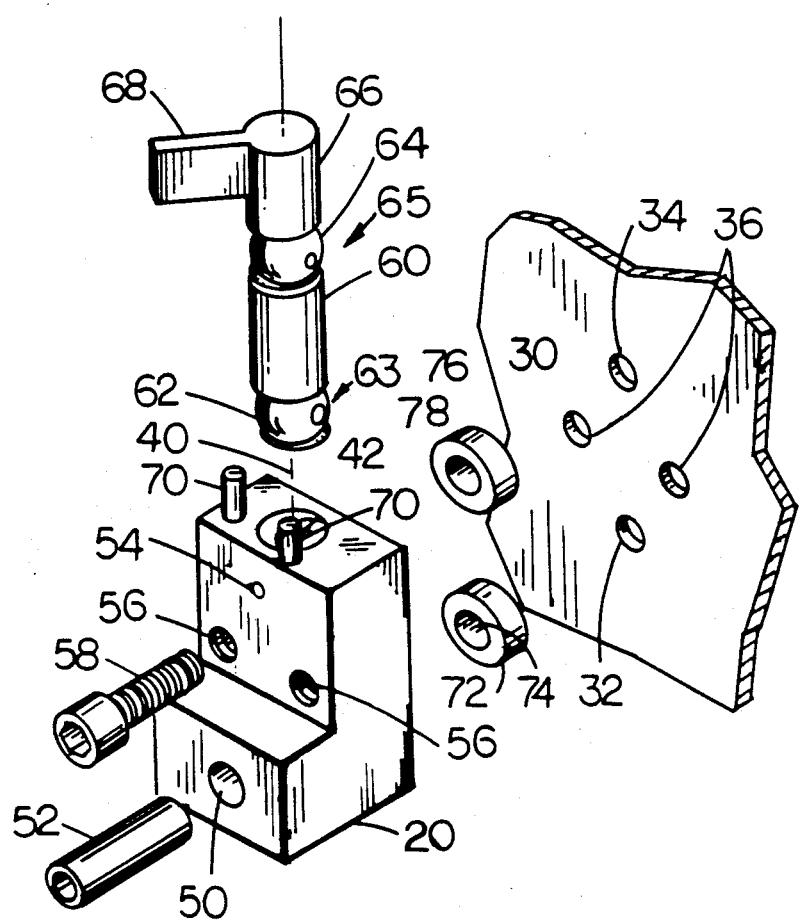
FIG. 3A is an exploded, unsectioned view of the self-venting drain valve shown in FIG. 3.

Spool 60 also has a hand engaging lever portion 66 which extends outside of body 20 which enables manual rotation of the spool. Lever 66 includes an ear 68 which extends radially outward therefrom. A pair of pins 70 (see FIG. 3a) are mounted on body 20 and serve as stop means. Pins 70 limit the rotational movement of spool 60 over an angle necessary to open and close the valve as later explained.

A first seal 72 is positioned in first hole 44. Seal 72 is constructed of resilient material and has an opening 74 extending through its center. When the drain valve is attached to the container, seal 72 is compressed between the wall of the container adjacent fluid hole 32 and the first ball portion 62 of the spool. A second seal 76 is positioned in second hole 46 of the valve body. Second seal 76 is similar to seal 72 and includes an opening 78 therethrough. Second seal 76 is compressed between the wall adjacent vent hole 34 and second ball portion 64 of the spool when the valve body is mounted to the container. When the bolts 58, which hold the valve body and container together are tightened, seals 72 and 76 are compressed to maintain a fluid tight relation between the container wall and the spool. It is to be understood however that in other embodiments of the invention the movable member and wall of the container could be constructed with sufficiently close tolerances to eliminate the need for resilient sealing means to maintain a fluid tight relation.

Figure 4B:
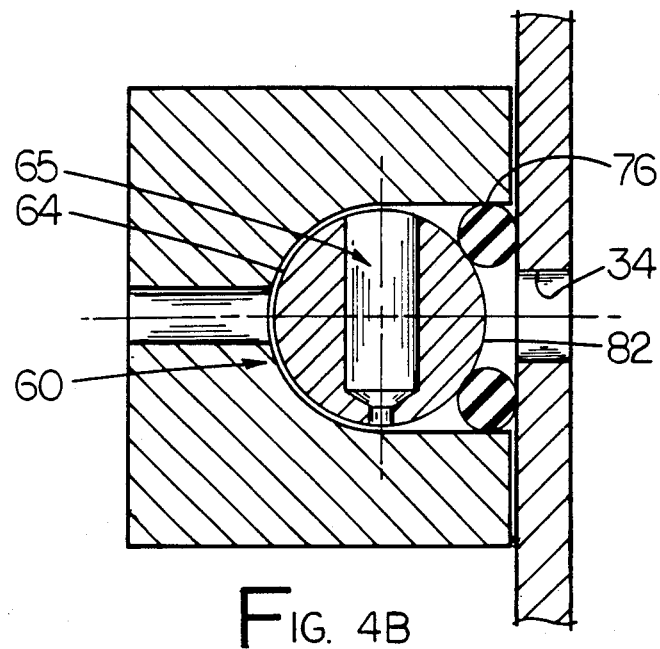
FIGS. 4(a) and (b) are cross-sectional views of the relative positions of the first ball portion and second ball portion respectively, of the spool of the valve in a first rotational position.
Figure 4A:
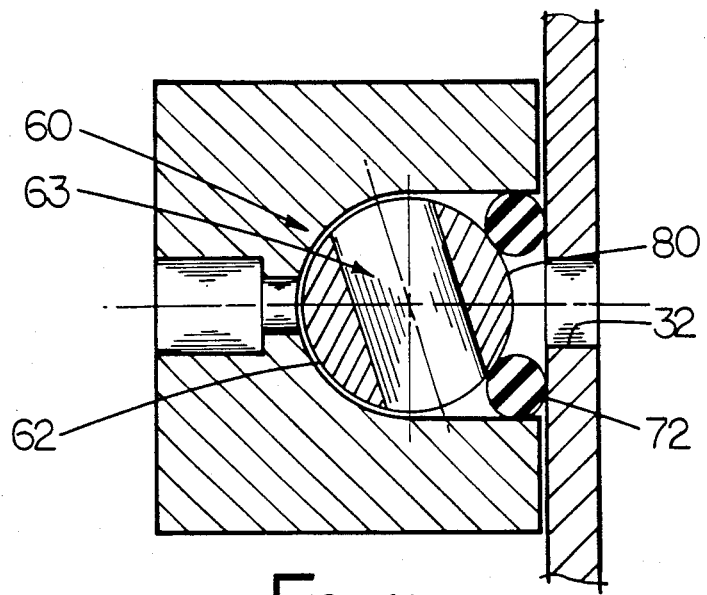
Figure 5B:
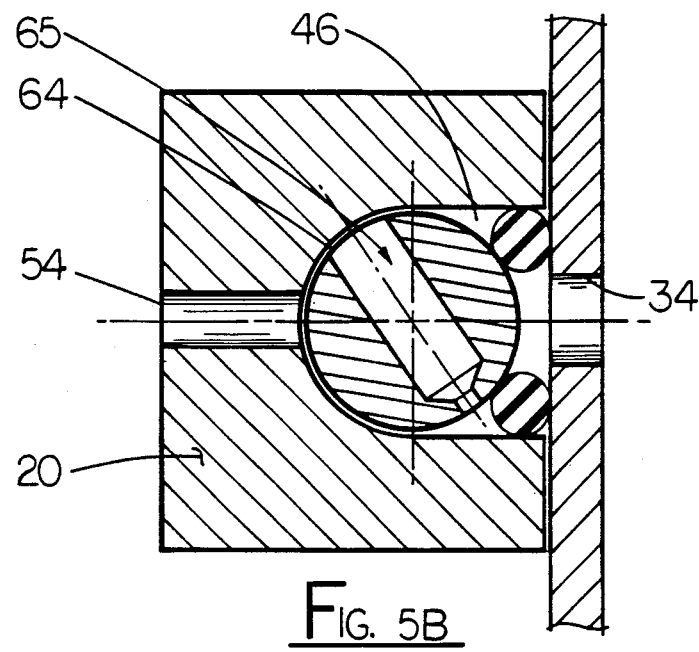
FIG. 5(a) and (b) are cross-sectional views of the first ball portion and second ball portion respectively, of the spool of the valve in a second rotational position.

The operation of the self venting drain valve 10 is readily understood with reference to FIGS. 4(a) and (b) through 6(a) and (b). A cross-sectional view of second ball portion 64 of spool 60 is shown in FIGS. 4(b), 5(b), and 6(b). The corresponding relative position of first ball portion 62 of the spool for the positions of the spool depicted in FIGS. 4(b) through 6(b) are shown respectively in FIGS. 4(a) through 6(a). In FIGS. 4(a) and (b) spool 60 is shown in a first position which corresponds to the fully closed position of the drain valve. A first curved face portion 80 of first ball portion 62 blocks the passage of fluid from fluid hole 32 in the wall of the container. Similarly, a second curved portion 82 of second ball portion 64 similarly blocks vent hole 34 when the spool is in the first position.

Figure 5A:
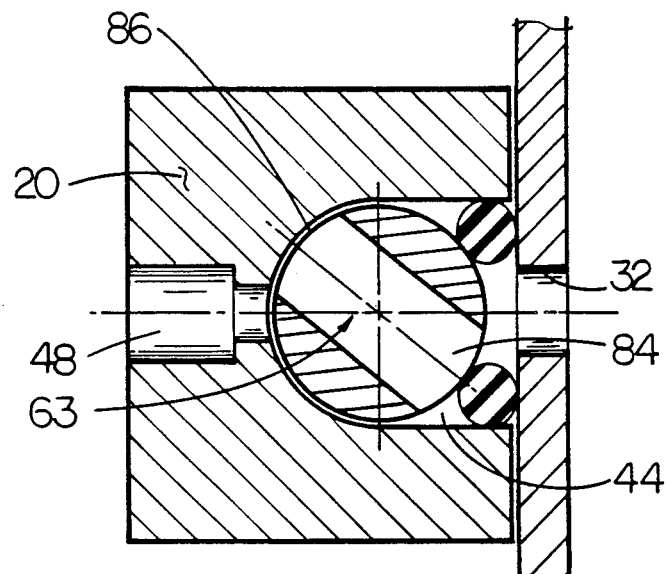
Figure 6B:
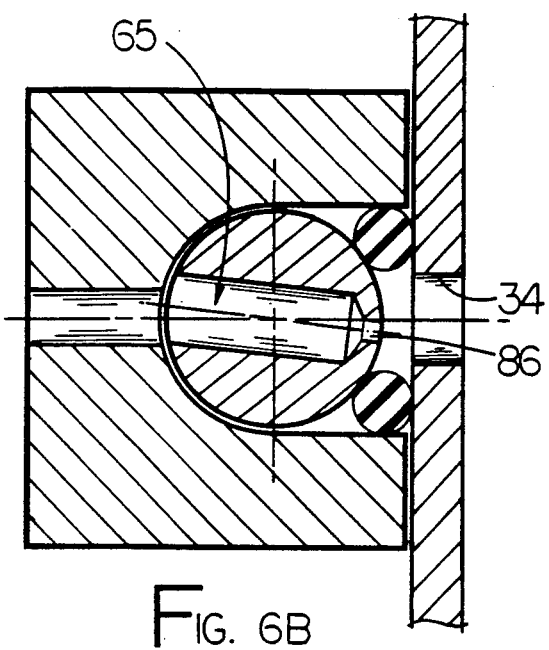
FIGS. 6(a) and (b) are cross-sectional views of the first ball portion and second ball portion respectively, of the spool of the valve in a third position.

Rotation of spool 60 in a first direction (counterclockwise as shown) from the first position, eventually brings spool 60 to a second position shown in FIGS. 5(a) and (b). In this second position, an opening 84 which serves as fluid accepting means in first ball portion 62 brings first fluid passage 63 through ball portion 62 into fluid communication with fluid hole 32 in the container. This enables some fluid to pass through the opening in seal 72, into opening 84 through first fluid passage 63, and to exit from first ball portion 62 through an outlet 86. From outlet 86 in first ball portion 62, fluid passes out of the valve body through drain port 48.

The drainage of fluid from drain port 48 places the generally air tight container under a slight negative pressure. As shown in FIG. 5(b), in the second position of the spool second ball portion 64 does not have its second fluid passage 65 in fluid communication with vent hole 34. As a result, this slight negative pressure inside the container is maintained and the flow through the drain port of the valve stops fairly quickly.

Figure 6A:
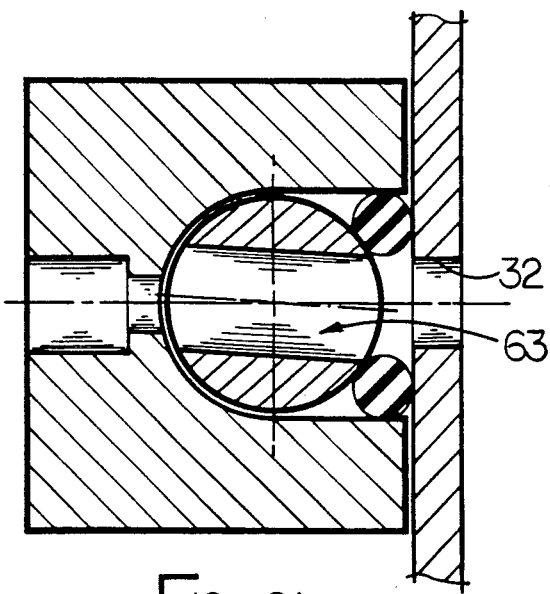

Further movement of spool 60 in the first direction from the position shown in FIGS. 5(a) and (b) eventually brings the spool of the valve to the third position which is shown in FIGS. 6(a) and 6(b). In this position the valve is fully opened and the first fluid passage 63 in ball portion 62 is closely aligned with fluid hole 32 in the container wall and drain port 48 in the valve body. In this position, fluid is able to readily pass out of the valve.

As shown in FIG. 6(b) in the third position of the valve, the second fluid passage 65 in second ball portion 64 of the spool is in fluid communication with the vent hole 34 in the container wall. The second air passage 65 through the second ball portion 62 of the spool includes an air inlet opening 86 adjacent the vent hole. This air inlet opening is relatively small to create a small air bubble that may readily pass through vent hole 34. In the third position of the valve, the end of second air passage 65 opposite air inlet opening 86 is in communication with air vent opening 54 of the valve body. As the container was placed under slight negative pressure when the spool was in the second position, the opening of vent hole 34 to atmosphere through the second ball portion causes air to enter the container through the second ball portion. Having the container under negative pressure in advance of opening the container to atmosphere insures that only liquid will drain through the drain port 48 and only air will enter through the air vent opening 54 of the valve body.

It has been found that the valve operates best when the ratio of the area of the drain port 48 is approximately twice the area of air vent opening 54.

As mentioned previously, in the preferred embodiment, pins 70 are positioned to engage the ear of the spool so that the spool may not be moved in the first direction beyond the fully open third position. As can be readily seen from FIG. 6(a), rotation of the spool beyond the fully open position may not only cause premature wearing of the seal but would also impede drainage through the valve. When it is desired to close the valve, spool 60 is moved in a direction opposite the first direction (clockwise in FIGS. 4 through 6) so that the spool is returned to the first position shown in FIGS. 4(a) and (b). In this first position, ear portion 68 of lever 66 engages one of the pins 70 so that the spool cannot be moved beyond the fully closed position of the valve.

The self venting drain valve of the present invention may be quickly primed and opened by turning the spool less than one-quarter turn. The lever portion of the spool can also be positioned so that when the valve is closed the ear is shielded by the sturdy valve body. This prevents the spool from being inadvertently bumped open or broken. Another advantage of the valve is that the spool is subject to pressure by the compression of the seals. This helps to maintain the valve in the closed position. In most applications, it is not necessary to use latching means such as a detent to hold the spool in a fully closed position. However, such latching means may be readily provided using approaches well known to those skilled in the art.

Thus, the new self-venting drain valve achieves the above stated objectives, eliminates difficulties encountered in the use of prior devices, solves problems and obtains the desirable results described herein.

In the foregoing description certain items have been used for brevity, clarity and understanding, however, no unnecessary limitations are to be implied therefrom because such terms are for descriptive purposes and are intended to be broadly construed. Moreover the descriptions and illustrations given are by way of example and the invention is not limited to the exact details shown or described.

Having described the features, discoveries and principles of the invention, the manner in which it is constructed and operated, and the advantages and useful results obtained, the new and useful structures, devices, elements, arrangements, parts, combinations, systems, equipment, operations and relationships are set forth in the appended claims.

What is claimed is:

1. A self-venting drain valve for draining liquid from a generally air tight container, said container including a wall, comprising:
    a fluid hole in said wall for passing liquid therethrough;
    a vent hole in said wall for passing air therethrough, said vent hole disposed laterally of said fluid hole;
    a movable member mounted for movement in a first rotational direction, said movable member having an axis of rotation generally parallel of said wall, said movable member including:
    a first ball portion, said first ball portion including a first curved face portion adjacent said wall, said first curved face portion in blocking relation of said fluid hole when said member is in a first position;
    said member further including a second ball portion, said second ball portion including a second curved face portion adjacent said wall, said second curved face portion in blocking relation of said vent hole when said member is in said first position;
    said member further including fluid accepting means in said first curved face portion for accepting fluid delivered at said first hole, said fluid accepting means in fluid communication with said fluid hole when said member is in a second position and in a third position;
    a liquid outlet in fluid communication with said fluid accepting means;
    said member further including an air passage through said member, said air passage terminating at an air inlet opening in said second curved face portion, said air inlet opening in communication with said vent hole in said wall when said member is in the third position;
    whereby when said member is in the first position said drain valve is closed, upon movement of said member in the first direction to the second position, said container is placed in a negative pressure condition, and upon further movement of said member in said first direction to a third position air is enabled to enter said container through said air passage enabling liquid to drain from said liquid outlet.

2. The drain valve according to claim 1 and further including sealing means for sealing said wall and said movable member in fluid tight relation.

3. The drain valve according to claim 1 wherein a first fluid passage extends through such first ball portion from said fluid accepting means to said liquid outlet.

4. The drain valve according to claim 3 wherein said air passage includes a second fluid passage extending through such second ball portion.

5. The drain valve according to claim 4 wherein said movable member comprises a spool, said spool including said first and second ball portions.

6. The drain valve according to claim 5 wherein said first and second ball portions are disposed from one another on said spool.

7. The drain valve according to claim 6 and further comprising, first sealing means for sealing said wall and said first ball portion in fluid tight relation, and second sealing means for sealing said wall and said second ball portion in fluid tight relation.

8. The drain valve according to claim 7 and further comprising a body, said spool journaled in said body.

9. The drain valve according to claim 8, said spool further comprising a hand engaging portion, said hand engaging portion extending from said body for manual movement of said spool between said first and third positions.

10. The drain valve according to claim 9 wherein said body includes a drain port, said drain port in fluid communication with said liquid outlet of said first fluid passage when said spool is in said second and third positions.

11. The drain valve according to claim 10 wherein said body further comprises an air vent opening, said second fluid passage in said second ball portion in fluid communication with said air vent opening in said body when said spool is in the third position.

12. The drain valve according to claim 11 wherein said first fluid passage in said first ball portion is of uniform circular cross section from said fluid accepting means to said liquid outlet, and said drain port in said body is circular in cross section, said first fluid passage and said drain port are similarly sized, and said first fluid passage and said drain port are in alignment when said spool is in said third position.

13. The drain valve according to claim 12 wherein the ratio of the area of said air vent opening to said drain port is generally two to one.

14. The drain valve according to claim 13 wherein said drain port in said body includes conduit accepting means for accepting a fluid conduit for conducting fluid drained from said container through said valve.

15. The drain valve according to claim 14, said valve further including first stop means for preventing rotational movement of said spool in the first direction when said spool is in the third position.

16. The drain valve according to claim 15 and further including second stop means for preventing rotation of said spool in a direction opposed of said first direction when said spool is in said first position.

17. The drain valve according to claim 8 wherein said body includes a bore, said bore sized for accepting said spool therein, said bore including access opening means on a first side thereof adjacent said wall.

18. The drain valve according to claim 17 wherein said access opening means comprising a first hole adjacent said first ball portion of said spool, and a second hole adjacent said second ball portion of said spool.

19. The drain valve according to claim 18 and further comprising, a first seal positioned in said first hole for maintaining said first ball portion and said fluid hole in said wall in fluid tight relation, and a second seal positioned in said second hole maintaining said second ball portion and said vent hole in said wall in fluid tight relation.

20. The drain valve according to claim 19 and further including fastening means for fastening said body to said container whereby said first and second seals maintain said wall and said spool in fluid tight relation.

21. A self-venting drain valve for draining liquid from a generally air tight container, said container including a wall, comprising:
 a fluid hole in said wall for passing liquid therethrough;
 a vent hole in said wall for passing air therethrough, said vent hole disposed laterally of said fluid hole;
 a movable member mounted for movement in a first rotational direction, said movable member including;
 a first spherical portion, said first spherical portion including a first face, said first face in blocking relation of said fluid hole when the member is in a first position;
 said member further including a second spherical portion, said second spherical portion including a second face, said second face in blocking relation of said vent hole when said member is in the first position;
 said member further including fluid accepting means in said first face for accepting fluid delivered at said first hole, said fluid accepting means in fluid communication with said fluid hole when said member is in a second position and in a third position;
 a liquid outlet in fluid communication with said fluid accepting means;
 said member further including an air passage through said member, said air passage terminating at an air inlet opening in said second face, said air inlet opening in communication with said vent hole in said wall when said member is in the third position;
 whereby when said member is in the first position said drain valve is closed, upon movement of said member in the first direction to the second position, said container is placed in a negative pressure condition, and upon further movement of said member in said first direction to a third position air is enabled to enter said container through said air passage enabling liquid to drain from said liquid outlet.

* * * * *